United States Patent
Kim

(10) Patent No.: US 11,453,442 B2
(45) Date of Patent: Sep. 27, 2022

(54) TRUCK CHASSIS FRAME

(71) Applicants: HYUNDAI MOTOR COMPANY, Seoul (KR); KIA MOTORS CORPORATION, Seoul (KR)

(72) Inventor: Jong Min Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 34 days.

(21) Appl. No.: 17/010,138

(22) Filed: Sep. 2, 2020

(65) Prior Publication Data

US 2021/0179176 A1 Jun. 17, 2021

(30) Foreign Application Priority Data

Dec. 13, 2019 (KR) .................. 10-2019-0167085

(51) Int. Cl.
| | |
|---|---|
| B62D 21/08 | (2006.01) |
| B62D 27/02 | (2006.01) |
| B62D 21/18 | (2006.01) |
| B62D 21/02 | (2006.01) |
| B60L 50/75 | (2019.01) |
| B60K 1/04 | (2019.01) |

(52) U.S. Cl.
CPC ............ B62D 21/08 (2013.01); B62D 21/02 (2013.01); B62D 21/18 (2013.01); B62D 27/023 (2013.01); *B60K 2001/0405* (2013.01); *B60L 50/75* (2019.02)

(58) Field of Classification Search
CPC ........ B62D 21/02; B62D 21/08; B62D 21/09; B62D 21/18; B62D 27/023; B60K 2001/0405; B60K 2001/0438; B60K 1/04; B60L 2200/36
See application file for complete search history.

(56) References Cited

U.S. PATENT DOCUMENTS

| | | | | |
|---|---|---|---|---|
| 4,290,642 A | * | 9/1981 | Wise | B62D 53/062 280/43.11 |
| 6,322,105 B1 | * | 11/2001 | Na | B62D 23/005 280/781 |
| 10,493,837 B1 | * | 12/2019 | Angelo | B60K 6/46 |
| 2009/0058142 A1 | * | 3/2009 | Park | B62D 25/20 296/193.07 |

(Continued)

FOREIGN PATENT DOCUMENTS

| | | | | |
|---|---|---|---|---|
| CN | 102303644 A | * | 1/2012 | ............. B62D 21/02 |
| CN | 104802860 A | * | 7/2015 | |

(Continued)

OTHER PUBLICATIONS

Na, Machine Translation of KR 20010066512 A Obtained Nov. 29, 2021, Jul. 11, 2001, Entire Document. (Year: 2001).*

*Primary Examiner* — James A English
*Assistant Examiner* — Scott F. Underwood
(74) *Attorney, Agent, or Firm* — McDonnell Boehnen Hulbert & Berghoff LLP

(57) ABSTRACT

A truck chassis frame includes a front frame facing a front of a vehicle, a rear frame facing a rear of the vehicle, and a mounting module connected between the front frame and the rear frame, and having a mounting space in which a component is mounted.

14 Claims, 14 Drawing Sheets

(56) References Cited

U.S. PATENT DOCUMENTS

| | | | |
|---|---|---|---|
| 2014/0251714 A1* | 9/2014 | Gulan | B60K 5/12 |
| | | | 180/312 |
| 2016/0039463 A1* | 2/2016 | Ormiston | B62D 21/08 |
| | | | 298/17 R |
| 2017/0349226 A1* | 12/2017 | Oren | B62D 21/02 |
| 2019/0210651 A1* | 7/2019 | Svacha | B62D 21/11 |
| 2020/0231212 A1* | 7/2020 | Kim | B60K 1/04 |

FOREIGN PATENT DOCUMENTS

| | | | | | |
|---|---|---|---|---|---|
| CN | 109334770 | A | * | 2/2019 | |
| DE | 102018009702 | A1 | * | 6/2019 | ............ B62D 21/08 |
| DE | 102019216352 | A1 | * | 7/2020 | .............. B60K 1/00 |
| JP | 2018187976 | A | * | 11/2018 | |
| KR | 20010066512 | A | * | 7/2001 | ............ B62D 31/02 |
| WO | WO-2020241036 | A1 | * | 12/2020 | ............... B60K 1/04 |

* cited by examiner

TRUCK CHASSIS FRAME

CROSS REFERENCE TO RELATED APPLICATIONS

This application is based on and claims the benefit of priority to Korean Patent Application No. 10-2019-0167085, filed on Dec. 13, 2019, in the Korean Intellectual Property Office, the disclosure of which is incorporated herein in its entirety by reference.

TECHNICAL FIELD

The present disclosure relates to a truck chassis frame, and more particularly, to a truck chassis frame integrally connected to a mounting module having a space for mounting a battery and/or various components.

BACKGROUND

A truck is a vehicle designed for transporting loads or goods. A truck chassis frame may have a pair of side rails which extend in a longitudinal direction of the truck, and are spaced apart from each other in a width direction of the truck. Each side rail may be a C-shaped beam made up of a web having a predetermined height and a pair of flanges formed on top and bottom ends of the web. In addition, the truck chassis frame may have a plurality of crossmembers which connect the side rails and are spaced apart at regular intervals in a longitudinal direction of the side rail. Each crossmember may have a length corresponding to the spacing between the side rails and a height corresponding to that of the web of each side rail so that each crossmember may fill an empty space between the webs of the side rails.

Trucks with internal combustion engines cause global warming problems due to exhaust emissions. In particular, trucks with diesel engines cause fine dust problems. To alleviate these problems, hydrogen-electric trucks using hydrogen fuel cells and electric motors are being developed. As for hydrogen-electric trucks, electronic systems for the operations of electric motors, hydrogen fuel cells, and other electric/electronic devices have been newly developed, but the body of hydrogen-electric trucks is still using an existing truck chassis frame for diesel-engine trucks.

Unlike the diesel-engine truck, the hydrogen-electric truck does not have an engine and a propeller shaft extending along the front and rear of the vehicle, but requires a relatively large space for mounting a battery for driving the electric motor, etc. In particular, an important factor of the hydrogen-electric truck is the driving range of the vehicle by the battery. For example, when more batteries are additionally mounted, the driving range of the vehicle may be significantly increased, which may greatly improve vehicle quality and marketability.

In general, a cargo container is disposed on the truck chassis frame, which makes it difficult to use a space above the truck chassis frame as a space for mounting the battery, etc.

In addition, the existing truck chassis frame does not provide enough space for mounting the battery as the plurality of crossmembers fill the empty space between the webs of the side rails. That is, the existing truck chassis frame has failed to properly utilize the empty space between the side rails.

Meanwhile, if some crossmembers are removed from sections of the existing truck chassis frame between the side rails in order to utilize the empty space between the side rails, the body stiffness of the truck may be reduced.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a truck chassis frame capable of mounting a battery and/or various components by connecting a mounting module having a mounting space between a front frame and a rear frame, thereby making the truck layout compact.

According to an aspect of the present disclosure, a truck chassis frame may include a front frame facing a front of a vehicle, a rear frame facing a rear of the vehicle, and a mounting module connected between the front frame and the rear frame, and having a mounting space in which a component is mounted.

The mounting module may include a first side frame and a second side frame spaced apart from the first side frame in a width direction of the vehicle, and the mounting space may be defined between the first side frame and the second side frame.

The first side frame may have a first reinforcing member and a second reinforcing member, and the first reinforcing member may be symmetrically disposed with respect to the second reinforcing member.

The second side frame may have a third reinforcing member and a fourth reinforcing member, and the third reinforcing member may be symmetrically disposed with respect to the fourth reinforcing member.

The mounting module may include a plurality of connecting members by which the first side frame and the second side frame are connected.

The mounting module may include a first upper connecting member and a second upper connecting member by which an upper end of the first side frame and an upper end of the second side frame are connected, and the first upper connecting member may be symmetrically disposed with respect to the second upper connecting member.

The mounting module may include a first lower connecting member and a second lower connecting member by which a lower end of the first side frame and a lower end of the second side frame are connected, and the first lower connecting member may be symmetrically disposed with respect to the second lower connecting member.

The mounting module may include a first front connecting member and a second front connecting member by which a front end of the first side frame and a front end of the second side frame are connected in the width direction of the vehicle, and the first front connecting member may intersect with the second front connecting member.

The mounting module may include a first rear connecting member and a second rear connecting member by which a rear end of the first side frame and a rear end of the second side frame are connected in the width direction of the vehicle, and the first rear connecting member may intersect with the second rear connecting member.

The mounting module may further include a plurality of first extension members extending outwards from the first side frame.

The mounting module may further include a plurality of second extension members extending outwards from the second side frame.

The first side frame may include a first front frame member facing the front frame, a first rear frame member facing the rear frame, a first upper frame member connecting an upper end of the first front frame member and an upper end of the first rear frame member, and a first lower frame member connecting a lower end of the first front frame member and a lower end of the first rear frame member. The second side frame may include a second front frame member facing the front frame, a second rear frame member facing the rear frame, a second upper frame member connecting an upper end of the second front frame member and an upper end of the second rear frame member, and a second lower frame member connecting a lower end of the second front frame member and a lower end of the second rear frame member.

The front frame may include a first front side rail and a second front side rail spaced apart from the first front side rail in the width direction of the vehicle.

A front end of the first upper frame member and a front end of the second upper frame member may be connected to the first front side rail and the second front side rail by a pair of first mounting brackets and a pair of second mounting brackets, respectively, and the upper end of the first front frame member and the upper end of the second front frame member may be connected to the first front side rail and the second front side rail by a pair of third mounting brackets, respectively.

The rear frame may include a first rear side rail and a second rear side rail spaced apart from the first rear side rail in the width direction of the vehicle.

A rear end of the first upper frame member and a rear end of the second upper frame member may be connected to the first rear side rail and the second rear side rail by a pair of fourth mounting brackets and a pair of fifth mounting brackets, respectively, and the upper end of the first rear frame member the upper end of the second rear frame member may be connected to the first rear side rail and the second rear side rail by a pair of sixth mounting brackets, respectively.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
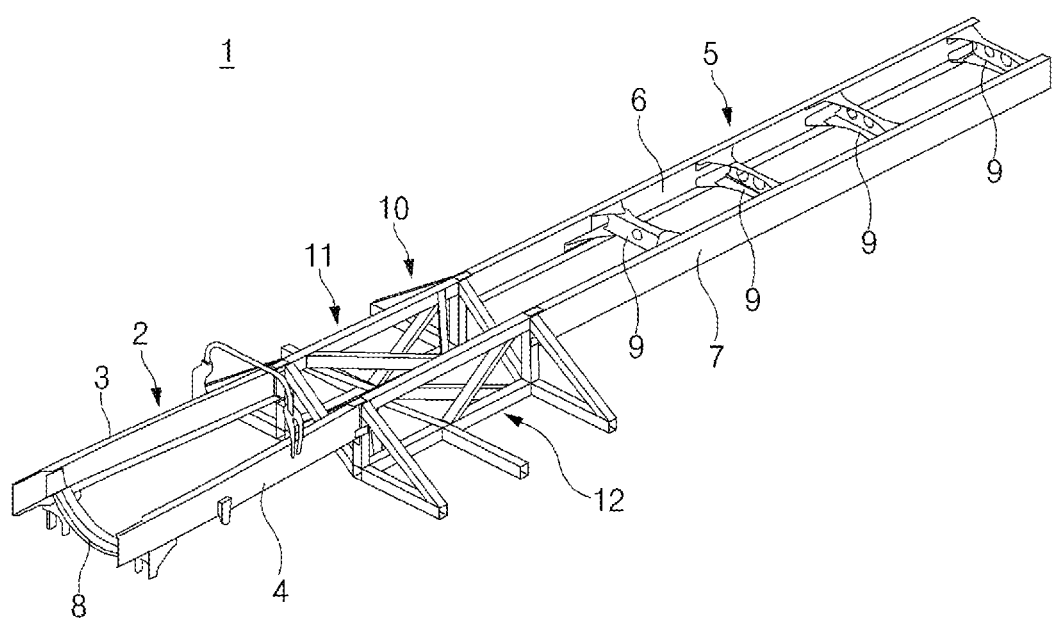
FIG. 1 illustrates a perspective view of a truck chassis frame according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a truck chassis frame 1 according to an exemplary embodiment of the present disclosure may include a front frame 2 facing the front of the vehicle, a rear frame 5 facing the rear of the vehicle, and a mounting module 10 connected between the front frame 2 and the rear frame 5.

The front frame 2 may include a first front side rail 3, a second front side rail 4 spaced apart from the first front side rail 3 in a width direction of a vehicle, and one or more front crossmembers 8 connecting the first front side rail 3 and the second front side rail 4.

The rear frame 5 may include a first rear side rail 6, a second rear side rail 7 spaced apart from the first rear side rail 6 in the width direction of the vehicle, and a plurality of rear crossmembers 9 connecting the first rear side rail 6 and the second rear side rail 7.

According to an exemplary embodiment, a length of the front frame 2 may be shorter than a length of the rear frame 5. The front frame 2 may be adjacent to a cabin or be located under the cabin, and the rear frame 5 may be located under a cargo container or platform.

According to another exemplary embodiment, the length of the front frame 2 may be equal to or longer than the length of the rear frame 5.

Figure 2:
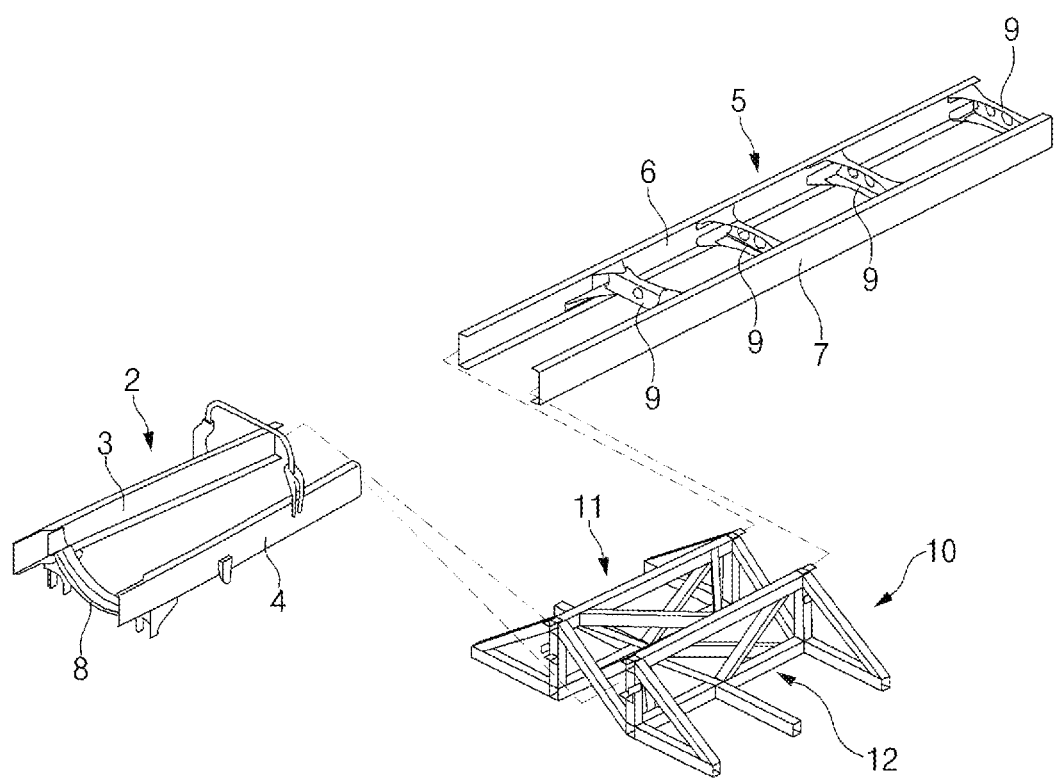
FIG. 2 illustrates an exploded perspective view of a truck chassis frame according to an exemplary embodiment of the present disclosure.

Referring to FIGS. 1 and 2, the mounting module 10 may include a first side frame 11 and a second side frame 12 spaced apart from the first side frame 11 in the width direction of the vehicle. The first side frame 11 may connect the first front side rail 3 of the front frame 2 and the first rear side rail 6 of the rear frame 5, and the second side frame 12 may connect the second front side rail 4 of the front frame 2 and the second rear side rail 7 of the rear frame 5.

Figure 3:
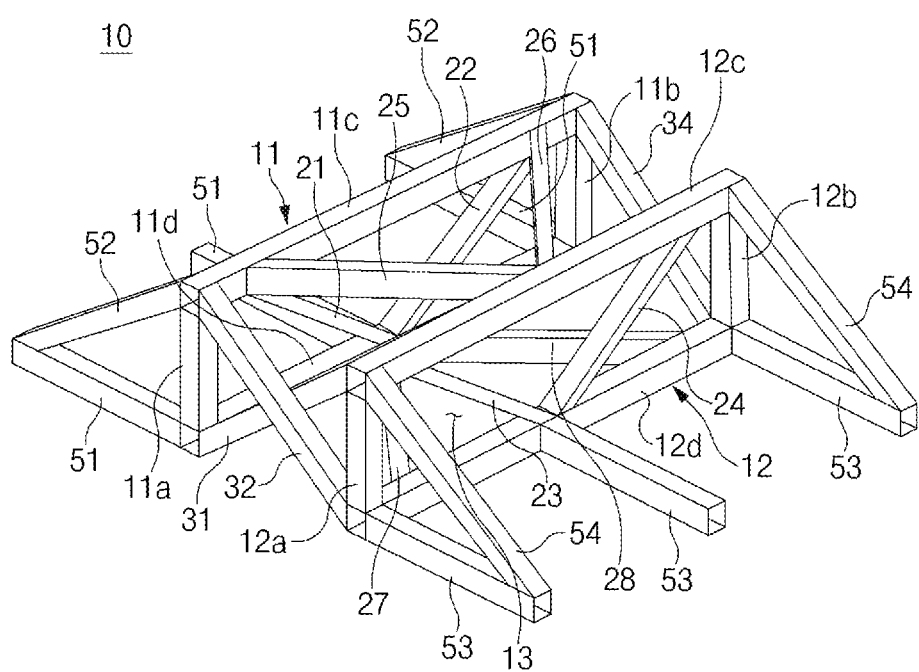
FIG. 3 illustrates a perspective view of a mounting module of a truck chassis frame according to an exemplary embodiment of the present disclosure.

Referring to FIG. 3, the first side frame 11 may include a plurality of first frame members 11a, 11b, 11c, and 11d connected by welding and/or the like, and each of the first frame members 11a, 11b, 11c, and 11d may be a square tube made of steel or the like. Specifically, the first side frame 11 may include a first front frame member 11a facing the front frame 2, a first rear frame member 11b facing the rear frame 5, a first upper frame member 11c connecting an upper end of the first front frame member 11a and an upper end of the first rear frame member 11b, and a first lower frame member 11d connecting a lower end of the first front frame member 11a and a lower end of the first rear frame member 11b.

The first front frame member 11a and the first rear frame member 11b may extend in a height direction of the truck, and the first upper frame member 11c and the first lower frame member 11d may extend in a longitudinal direction of the truck.

The second side frame 12 may include a plurality of second frame members 12a, 12b, 12c, and 12d connected by welding and/or the like, and each of the second frame members 12a, 12b, 12c, and 12d may be a square tube made of steel or the like. Specifically, the second side frame 12 may include a second front frame member 12a facing the front frame 2, a second rear frame member 12b facing the rear frame 5, a second upper frame member 12c connecting an upper end of the second front frame member 12a and an upper end of the second rear frame member 12b, and a second lower frame member 12d connecting a lower end of the second front frame member 12a and a lower end of the second rear frame member 12b.

The second front frame member 12a and the second rear frame member 12b may extend in the height direction of the truck, and the second upper frame member 12c and the second lower frame member 12d may extend in the longitudinal direction of the truck.

The stiffness and strength of the first side frame 11 may be increased by a plurality of reinforcing members 21 and 22. Specifically, a first reinforcing member 21 may extend diagonally to connect a front portion of the first upper frame member 11c and a central portion of the first lower frame member 11d, and a second reinforcing member 22 may extend diagonally to connect a rear portion of the first upper frame member 11c and the central portion of the first lower frame member 11d. An axis of the first reinforcing member 21 may intersect with an axis of the second reinforcing member 22 at a predetermined angle, and the first reinforcing member 21 may be symmetrically disposed with respect to the second reinforcing member 22. Thus, a load transferred to the mounting module 10 may be uniformly distributed through the first reinforcing member 21 and the second reinforcing member 22.

The stiffness and strength of the second side frame 12 may be increased by a plurality of reinforcing members 23 and 24. Specifically, a third reinforcing member 23 may extend diagonally to connect a front portion of the second upper frame member 12c and a central portion of the second lower frame member 12d, and a fourth reinforcing member 24 may extend diagonally to connect a rear portion of the second upper frame member 12c and the central portion of the second lower frame member 12d. An axis of the third reinforcing member 23 may intersect with an axis of the fourth reinforcing member 24 at a predetermined angle, and the third reinforcing member 23 may be symmetrically disposed with respect to the fourth reinforcing member 24. Thus, a load transferred to the mounting module 10 may be uniformly distributed through the third reinforcing member 23 and the fourth reinforcing member 24.

A mounting space 13 for mounting components such as a battery 61 may be defined between the first side frame 11 and the second side frame 12.

The mounting module 10 may include a plurality of connecting members 25, 26, 27 28, 31, 32, 33, and 34 connecting the first side frame 11 and the second side frame 12. The first side frame 11 and the second side frame 12 may be firmly connected to each other by the plurality of connecting members 25, 26, 27 28, 31, 32, 33, and 34.

The mounting module 10 may include first and second upper connecting members 25 and 26 by which an upper end of the first side frame 11 and an upper end of the second side frame 12 are connected, and first and second lower connecting members 27 and 28 by which a lower end of the first side frame 11 and a lower end of the second side frame 12 are connected. The components such as the battery 61 may be mounted in the mounting space 13 and supported by the upper connecting members 25 and 26 and the lower connecting members 27 and 28.

Figure 4:
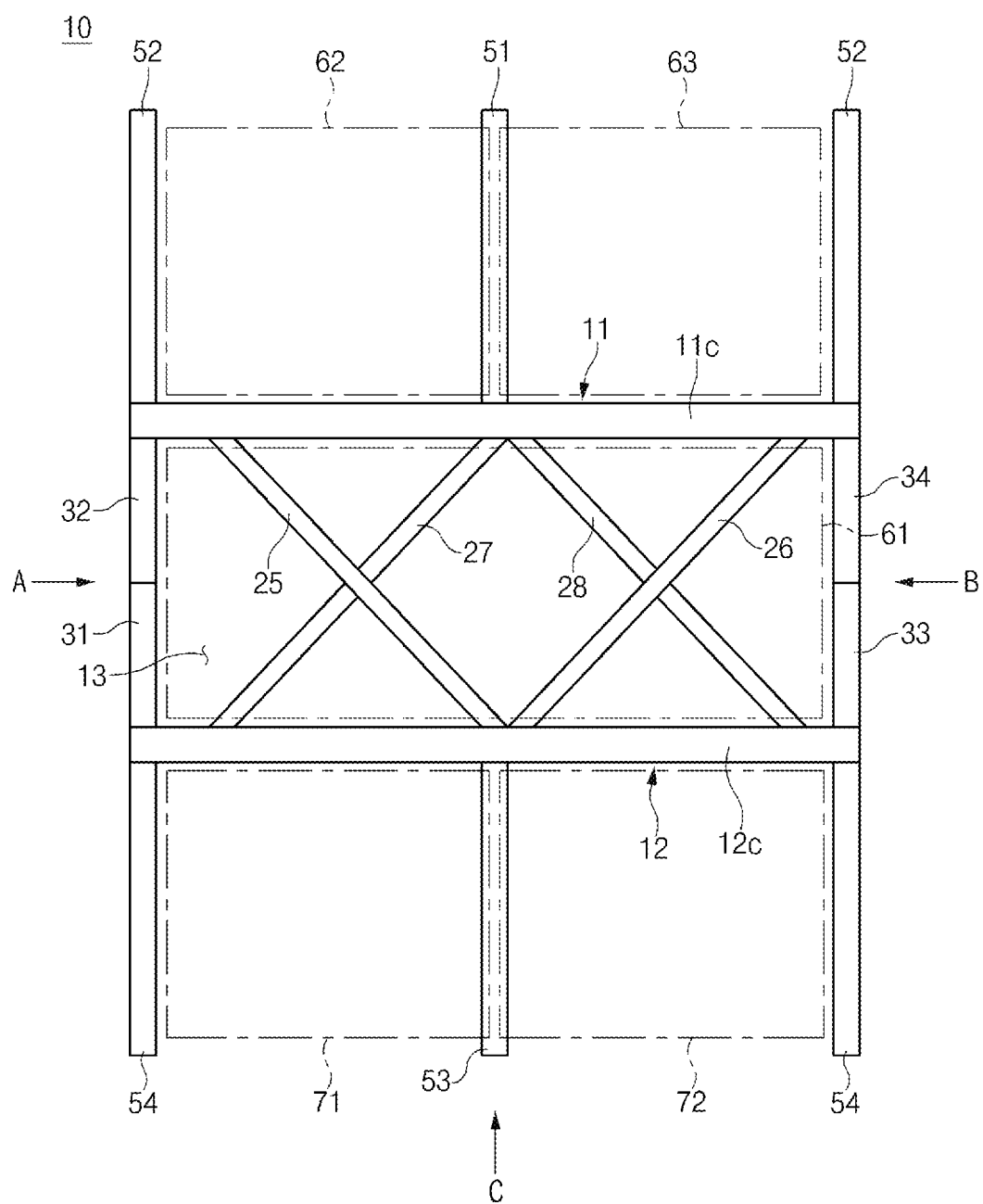
FIG. 4 illustrates a plan view of a mounting module of a truck chassis frame according to an exemplary embodiment of the present disclosure.

Referring to FIGS. 3 and 4, the first upper connecting member 25 may extend diagonally to connect the front portion of the first upper frame member 11c and a central portion of the second upper frame member 12c, and the second upper connecting member 26 may extend diagonally to connect the rear portion of the first upper frame member 11c and the central portion of the second upper frame member 12c. An axis of the first upper connecting member 25 may intersect with an axis of the second upper connecting member 26 at a predetermined angle, and the first upper connecting member 25 may be symmetrically disposed with respect to the second upper connecting member 26. Thus, a load transferred to the mounting module 10 may be uniformly distributed through the first upper connecting member 25 and the second upper connecting member 26.

The first lower connecting member 27 may extend diagonally to connect a front portion of the second lower frame member 12d and the central portion of the first lower frame member 11d, and the second lower connecting member 28 may extend diagonally to connect a rear portion of the second lower frame member 12d and the central portion of the first lower frame member 11d. An axis of the first lower connecting member 27 may intersect with an axis of the second lower connecting member 28 at a predetermined angle, and the first lower connecting member 27 may be symmetrically disposed with respect to the second lower connecting member 28. Thus, a load transferred to the mounting module 10 may be uniformly distributed through the first lower connecting member 27 and the second lower connecting member 28.

The mounting module 10 may include first and second front connecting members 31 and 32 by which a front end of the first side frame 11 and a front end of the second side frame 12 are connected, and first and second rear connecting members 33 and 34 by which a rear end of the first side frame 11 and a rear end of the second side frame 12 are connected.

Figure 5:
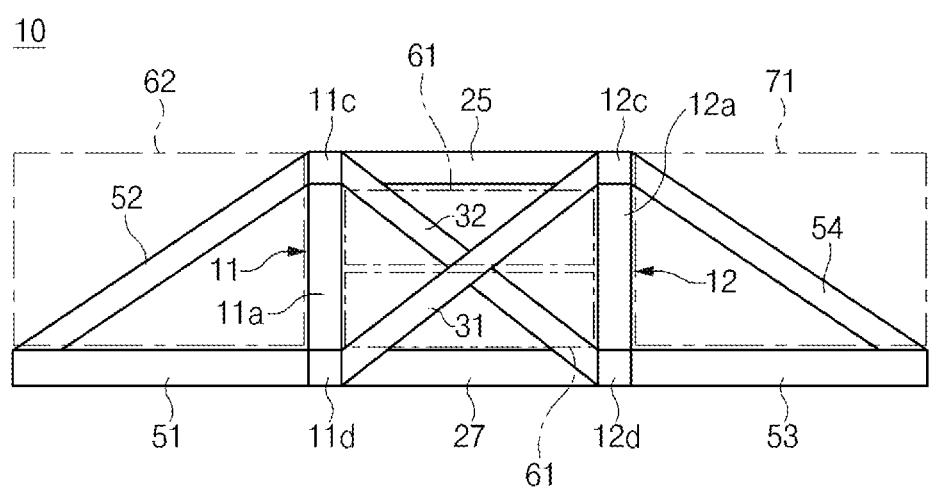
FIG. 5 illustrates a front view which is viewed in a direction indicated by arrow A of FIG. 4.

Referring to FIGS. 3 and 5, the first front connecting member 31 may extend diagonally to connect a front end of the second upper frame member 12c and a front end of the first lower frame member 11d, and the second front connecting member 32 may extend diagonally to connect a front end of the first upper frame member 11c and a front end of the second lower frame member 12d. The first front connecting member 31 may intersect with the second front connecting member 32 at a predetermined angle, and thus a load transferred to the mounting module 10 may be uniformly distributed.

Figure 6:
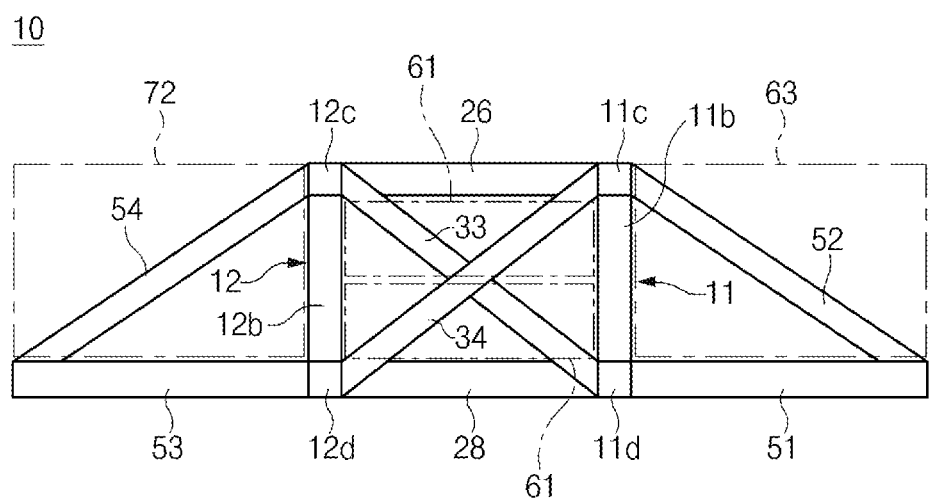
FIG. 6 illustrates a rear view which is viewed in a direction indicated by arrow B of FIG. 4.
Figure 7:
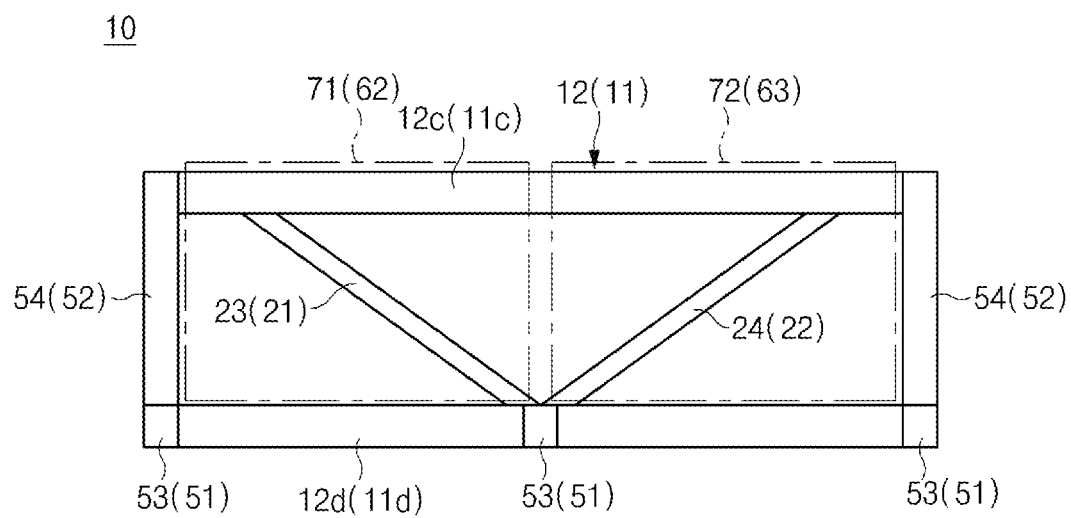
FIG. 7 illustrates a side view which is viewed in a direction indicated by arrow C of FIG. 4.

Referring to FIGS. 3 and 6, the first rear connecting member 33 may extend diagonally to connect a rear end of the second upper frame member 12c and a rear end of the first lower frame member 11d, and the second rear connecting member 34 may extend diagonally to connect a rear end of the first upper frame member 11c and a rear end of the second lower frame member 12d. The first rear connecting member 33 may intersect with the second rear connecting member 34 at a predetermined angle, and thus a load transferred to the mounting module 10 may be uniformly distributed.

The mounting space 13 for mounting the components such as the battery 61 may be defined by the first side frame 11, the second side frame 12, the first and second front connecting members 31 and 32, and the first and second rear connecting members 33 and 34.

The mounting module 10 may include a plurality of first extension members 51 and 52 extending outwards from the first side frame 11, and a plurality of second extension members 53 and 54 extending outwards from the second side frame 12. The plurality of first extension members 51 and 52 and the plurality of second extension members 53 and 54 may be attached to the first side frame 11 and the second side frame 12 to define an enlarged mounting space for mounting other components 62, 63, 71, and 72 in addition to the battery 61. The components 62, 63, 71, and 72 may include a controller and its relevant component, and a fuel cell stack and its relevant component.

The plurality of first extension members 51 and 52 may include a plurality of first horizontal extension members 51 extending horizontally from the first lower frame member 11d of the first side frame 11, and a plurality of first inclined extension members 52 extending obliquely from the first upper frame member 11c of the first side frame 11. Specifically, the plurality of first horizontal extension members 51 may be spaced apart from each other in a longitudinal direction of the mounting module 10, and the pair of first inclined extension members 52 may be disposed on the front and rear ends of the first side frame 11, respectively. Each first inclined extension member 52 may extend obliquely to connect the first upper frame member 11c and the first horizontal extension member 51. For example, as illustrated in FIGS. 4 to 7, the components such as a controller 62 and a controller cooling module 63 may be mounted and supported to the plurality of first horizontal extension members 51 and the plurality of first inclined extension members 52.

The plurality of second extension members 53 and 54 may include a plurality of second horizontal extension members 53 extending horizontally from the second lower frame member 12d of the second side frame 12, and a plurality of second inclined extension members 54 extending obliquely from the second upper frame member 12c of the second side frame 12. Specifically, the plurality of second horizontal extension members 53 may be spaced apart from each other in the longitudinal direction of the mounting module 10, and the pair of second inclined extension members 54 may be disposed on the front and rear ends of the second side frame 12, respectively. Each second inclined extension member 54 may extend obliquely to connect the second upper frame member 12c and the second horizontal extension member 53. For example, as illustrated in FIGS. 4 to 7, the components such as a fuel cell stack 71 and a stack cooling module 72 may be mounted and supported to the plurality of second horizontal extension members 53 and the plurality of second inclined extension members 54.

Figure 8:
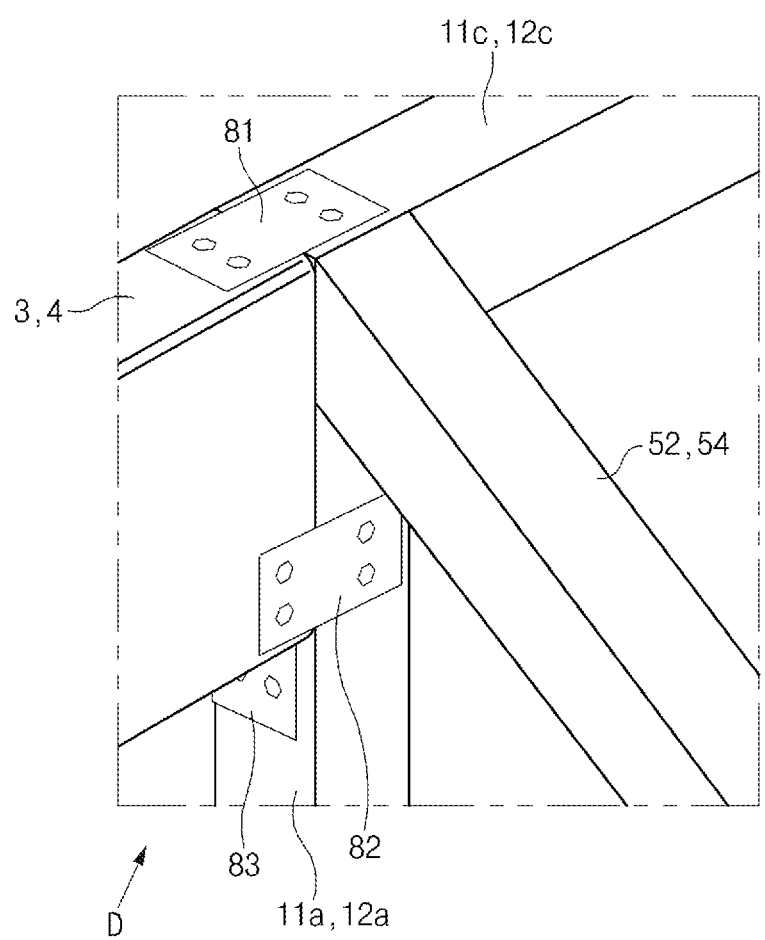
FIG. 8 illustrates a perspective view of a connected structure of a front end of a mounting module and a front frame in a truck chassis frame according to an exemplary embodiment of the present disclosure.

The front end of the first side frame 11 and the front end of the second side frame 12 of the mounting module 10 may be connected to the first front side rail 3 and the second front side rail 4 of the front frame 2 by a pair of first mounting brackets 81, a pair of second mounting brackets 82, and a pair of third mounting brackets 83, respectively (shown in FIG. 8).

Figure 9:
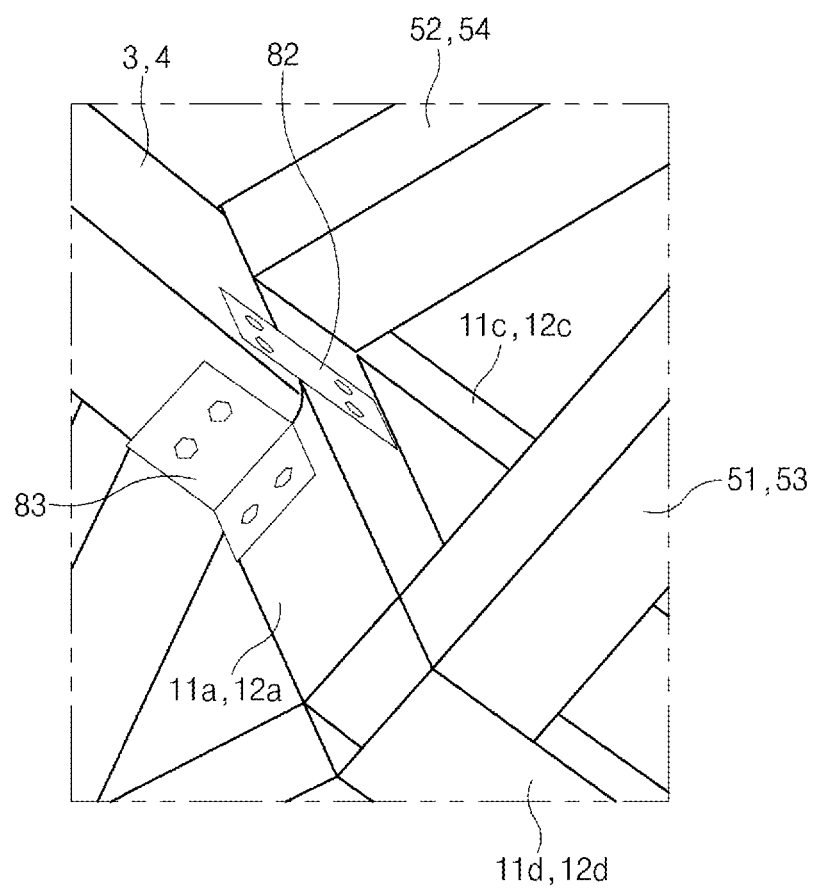
FIG. 9 illustrates a view which is viewed in a direction indicated by arrow D of FIG. 8.

Referring to FIGS. 8 and 9, the front end of the first upper frame member 11c and the front end of the second upper frame member 12c may be connected to the first front side rail 3 and the second front side rail 4 by the pair of first mounting brackets 81 and the pair of second mounting brackets 82, respectively, and the upper end of the first front frame member 11a and the upper end of the second front frame member 12a may be connected to the first front side rail 3 and the second front side rail 4 by the pair of third mounting brackets 83, respectively.

The rear end of the first side frame 11 and the rear end of the second side frame 12 of the mounting module 10 may be connected to the first rear side rail 6 and the second rear side rail 7 of the rear frame 5 by a pair of fourth mounting brackets 84, a pair of fifth mounting brackets 85, and a pair of sixth mounting brackets 86, respectively.

Figure 10:
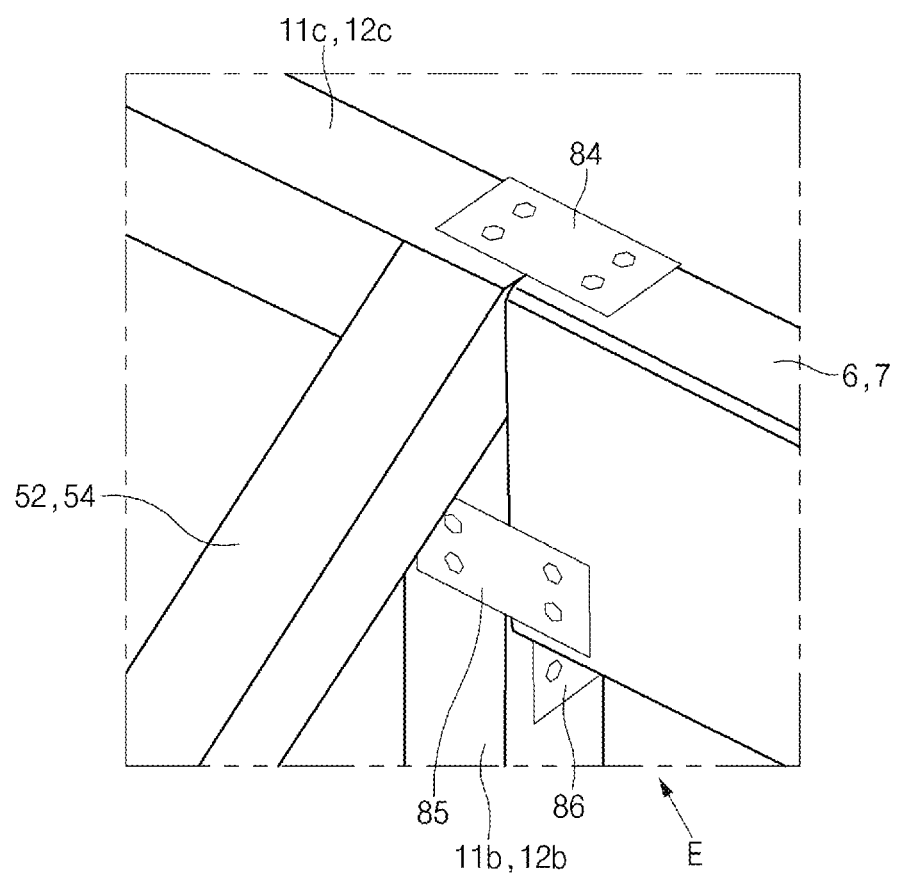
FIG. 10 illustrates a perspective view of a connected structure of a rear end of a mounting module and a rear frame in a truck chassis frame according to an exemplary embodiment of the present disclosure.
Figure 11:
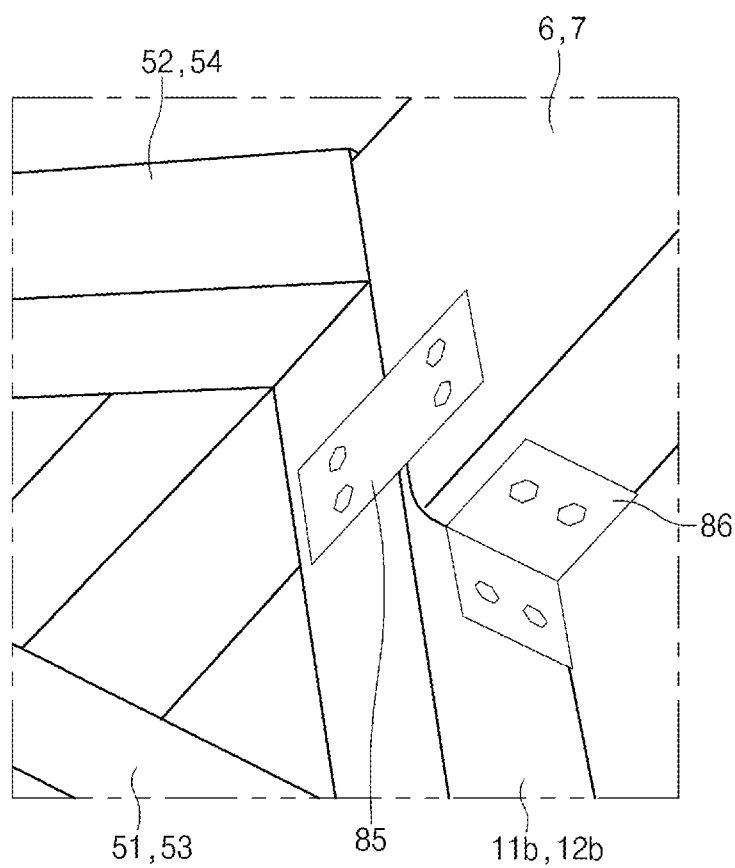
FIG. 11 illustrates a view which is viewed in a direction indicated by arrow E of FIG. 10.

Referring to FIGS. 10 and 11, the rear end of the first upper frame member 11c and the rear end of the second upper frame member 12c may be connected to the first rear side rail 6 and the second rear side rail 7 by the pair of fourth mounting brackets 84 and the pair of fifth mounting brackets 85, respectively, and the upper end of the first rear frame member 11b the upper end of the second rear frame member 12b may be connected to the first rear side rail 6 and the second rear side rail 7 by the pair of sixth mounting brackets 86, respectively.

Figure 12:
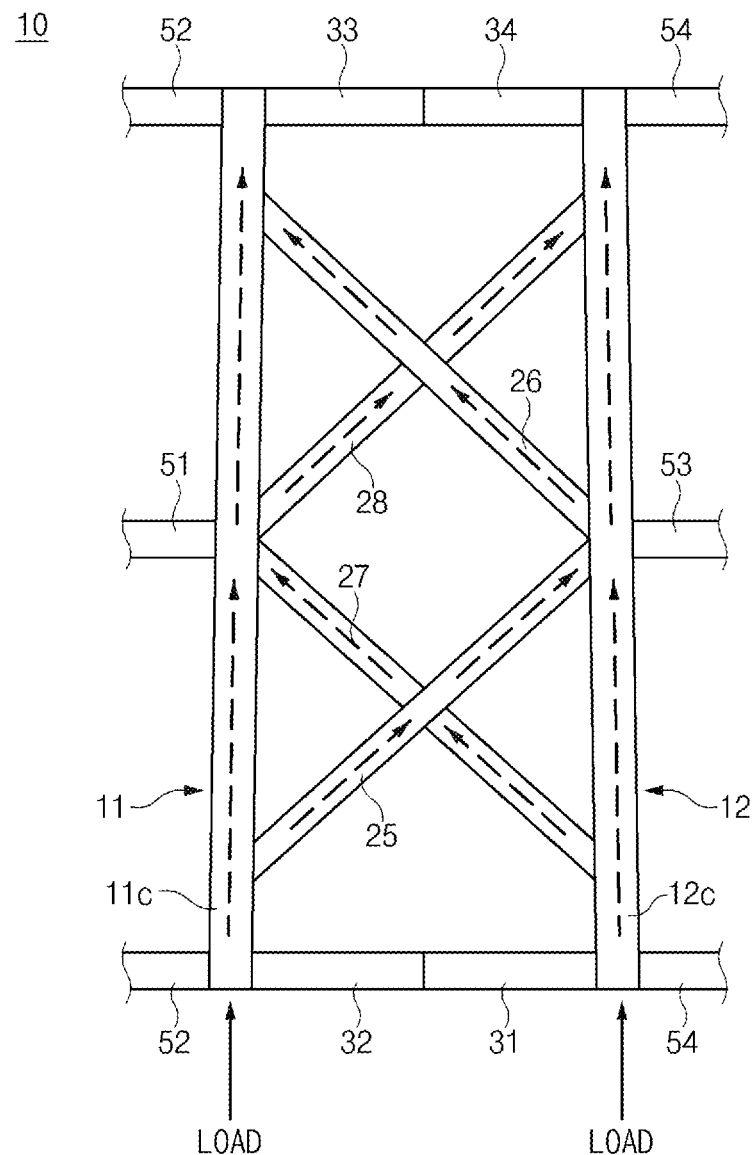
FIG. 12 illustrates a plan view of a load path applied to a mounting module of a truck chassis frame according to an exemplary embodiment of the present disclosure.

FIG. 12 illustrates a plan view of a load path applied to a mounting module of a truck chassis frame according to an exemplary embodiment of the present disclosure. Referring to FIG. 12, when a load generated during braking or collisions of the truck is transferred to the first and second side frames 11 and 12 of the mounting module 10, the load may be distributed through the first and second upper connecting members 25 and 26 and the first and second lower connecting members 27 and 28. In particular, the first upper connecting member 25 may be symmetrically disposed with respect to the second upper connecting member 26, and the first lower connecting member 27 may be symmetrically disposed with respect to the second lower connecting member 28, and thus the load transferred to the first and second side frames 11 and 12 may be uniformly distributed through the first and second upper connecting members 25 and 26 and the first and second lower connecting members 27 and 28.

Figure 13:
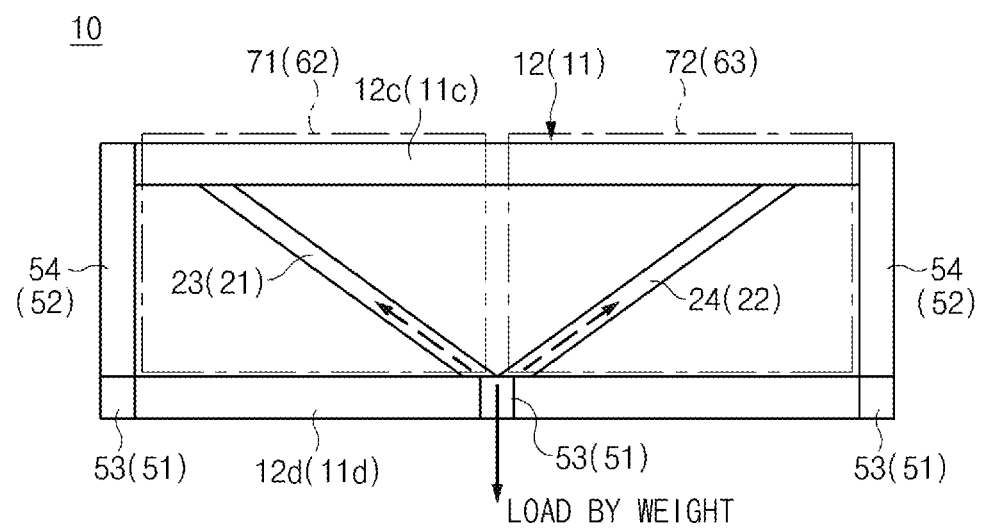
FIG. 13 illustrates a side view of a load path applied to a mounting module of a truck chassis frame according to an exemplary embodiment of the present disclosure.

FIG. 13 illustrates a side view of a load path applied to a mounting module of a truck chassis frame according to an exemplary embodiment of the present disclosure. Referring to FIG. 13, as the mounting module 10 supports one or more components 61, 62, 63, 71, and 72, a vertical load applied by the weights of one or more components 61, 62, 63, 71, and 72 may be uniformly distributed through the plurality of reinforcing members 21, 22, 23, and 24. In particular, the first reinforcing member 21 may be symmetrically disposed with respect to the second reinforcing member 22, and the third reinforcing member 23 may be symmetrically disposed with respect to the fourth reinforcing member 24, and thus the vertical load applied by the weights of the components 61, 62, 63, 71, and 72 may be uniformly distributed.

Figure 14:
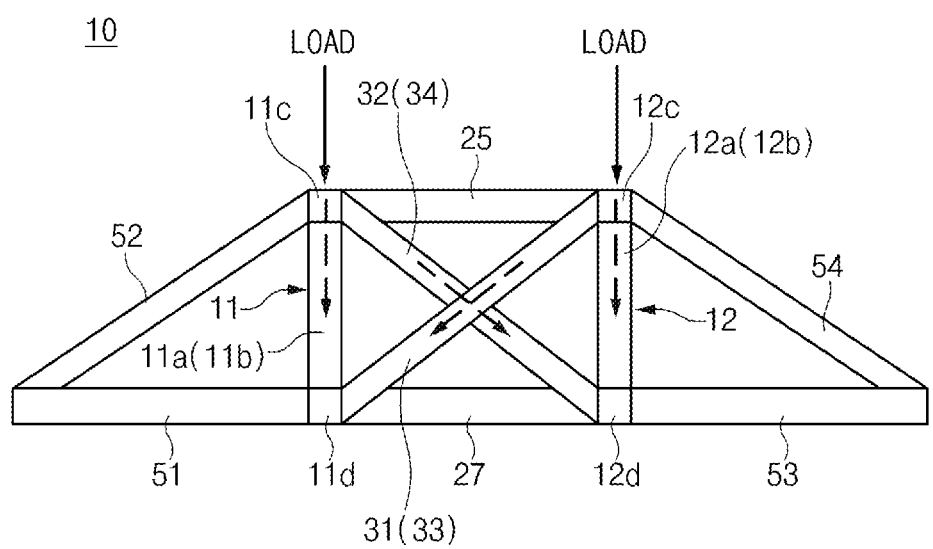
FIG. 14 illustrates a front or rear view of a load path applied to a mounting module of a truck chassis frame according to an exemplary embodiment of the present disclosure.

FIG. 14 illustrates a front or rear view of a load path applied to a mounting module of a truck chassis frame according to an exemplary embodiment of the present disclosure. Referring to FIG. 14, when a vertical load is transferred to the first and second side frames 11 and 12, the vertical load may be uniformly distributed through the first and second front connecting members 31 and 32 and the first and second rear connecting members 33 and 34. In particular, the first front connecting member 31 may intersect with the second front connecting member 32, and the first rear connecting member 33 may intersect with the second rear connecting member 34, and thus the vertical load transferred to the first and second side frames 11 and 12 may be uniformly distributed.

As set forth above, the truck chassis frame according to exemplary embodiments of the present disclosure may be formed by connecting the mounting module having the mounting space between the front frame and the rear frame so that the battery and/or various components may be mounted in the truck chassis frame. Thus, the space utilization of the truck chassis frame may be improved, and the layout of the truck chassis frame may be compact.

According to exemplary embodiments of the present disclosure, more batteries may be additionally mounted in the mounting space of the mounting module, which may extend the driving range of the vehicle due to increased battery capacity. In addition, the mounting module may have the enlarged mounting space extending toward the outside of the vehicle, which allow various components such as the fuel cell stack and the controller to be mounted in the truck chassis frame, thereby improving the space utilization of the truck chassis frame.

In addition, the mounting module may be connected between the front frame and the rear frame, thereby improving the stiffness of the vehicle body. Thus, the truck chassis frame may be commonly applicable to a variety of trucks such as hydrogen-electric trucks, diesel-engine trucks, and electric trucks.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A truck chassis frame, comprising:
   a front frame facing a front of a vehicle, and the front frame including a first front side rail and a second front side rail spaced apart from each other in a width direction of the vehicle;
   a rear frame facing a rear of the vehicle; and
   a mounting module connected between the front frame and the rear frame, the mounting module having a mounting space in which a component is mounted;
   wherein the mounting module includes a first side frame, and a second side frame spaced apart from the first side frame in the width direction of the vehicle;
   wherein a front end of the first side frame and a front end of the second side frame are connected to the first front side rail and the second front side rail of the first frame by a pair of first mounting brackets, a pair of second mounting brackets, and a pair of third mounting brackets;
   wherein the mounting module includes a first front connecting member and a second front connecting member by which a front end of the first side frame and a front end of the second side frame are connected in the width direction of the vehicle; and
   wherein the first front connecting member intersects with the second front connecting member.

2. The truck chassis frame according to claim 1, wherein the mounting space is defined between the first side frame and the second side frame.

3. The truck chassis frame according to claim 1, wherein the first side frame has a first reinforcing member and a second reinforcing member, and wherein the first reinforcing member is symmetrically disposed with respect to the second reinforcing member.

4. The truck chassis frame according to claim 1, wherein the second side frame has a third reinforcing member and a fourth reinforcing member, and wherein the third reinforcing member is symmetrically disposed with respect to the fourth reinforcing member.

5. The truck chassis frame according to claim 1, wherein the mounting module includes a plurality of connecting members by which the first side frame and the second side frame are connected.

6. The truck chassis frame according to claim 1, wherein the mounting module includes a first upper connecting member and a second upper connecting member by which an upper end of the first side frame and an upper end of the second side frame are connected, and
   wherein the first upper connecting member is symmetrically disposed with respect to the second upper connecting member.

7. The truck chassis frame according to claim 1, wherein the mounting module includes a first lower connecting member and a second lower connecting member by which a lower end of the first side frame and a lower end of the second side frame are connected, and
   wherein the first lower connecting member is symmetrically disposed with respect to the second lower connecting member.

8. The truck chassis frame according to claim 1, wherein the mounting module includes a first rear connecting member and a second rear connecting member by which a rear end of the first side frame and a rear end of the second side frame are connected in the width direction of the vehicle, and
   wherein the first rear connecting member intersects with the second rear connecting member.

9. The truck chassis frame according to claim 1, wherein the mounting module further includes a plurality of first extension members extending outwardly from the first side frame.

10. The truck chassis frame according to claim 1, wherein the mounting module further includes a plurality of second extension members extending outwardly from the second side frame.

11. The truck chassis frame according to claim 1, wherein the first side frame includes a first front frame member facing the front frame, a first rear frame member facing the rear frame, a first upper frame member connecting an upper end of the first front frame member and an upper end of the first rear frame member, and a first lower frame member connecting a lower end of the first front frame member and a lower end of the first rear frame member, and wherein the second side frame includes a second front frame member facing the front frame, a second rear frame member facing the rear frame, a second upper frame member connecting an upper end of the second front frame member and an upper end of the second rear frame member, and a second lower frame member connecting a lower end of the second front frame member and a lower end of the second rear frame member.

12. The truck chassis frame according to claim 11, wherein a front end of the first upper frame member and a front end of the second upper frame member are connected to the first front side rail and the second front side rail by the pair of first mounting brackets and the pair of second mounting brackets, and wherein the upper end of the first front frame member and the upper end of the second front frame member are connected to the first front side rail and the second front side rail by the pair of third mounting brackets.

13. The truck chassis frame according to claim 11, wherein the rear frame includes a first rear side rail and a second rear side rail spaced apart from the first rear side rail in the width direction of the vehicle.

14. The truck chassis frame according to claim 13, wherein a rear end of the first upper frame member and a rear end of the second upper frame member are connected to the first rear side rail and the second rear side rail by a pair of fourth mounting brackets and a pair of fifth mounting brackets, respectively, and wherein the upper end of the first rear frame member the upper end of the second rear frame member are connected to the first rear side rail and the second rear side rail by a pair of sixth mounting brackets, respectively.

* * * * *